United States Patent [19]
Bonner

[11] Patent Number: 5,437,844
[45] Date of Patent: Aug. 1, 1995

[54] CORONA TREATER ELECTRODE COOLING SYSTEM

[75] Inventor: William H. Bonner, Cedarburg, Wis.

[73] Assignee: Pillar Technologies, Inc., Hartland, Wis.

[21] Appl. No.: 142,616

[22] Filed: Oct. 25, 1993

[51] Int. Cl.$^6$ .................. C01B 13/11; B01J 19/08
[52] U.S. Cl. .................. 422/186; 422/186.24; 422/186.3; 422/906; 422/186.05; 422/900; 422/312; 422/160; 204/392; 174/15.1; 165/172; 165/177; 165/184; 165/186
[58] Field of Search .............. 422/186, 186.04, 186.3, 422/906, 900, 186.05, 312, 168; 204/302; 165/186, 172, 177, 184; 174/15.1

[56] References Cited

U.S. PATENT DOCUMENTS

| | | | |
|---|---|---|---|
| 3,622,492 | 11/1971 | Kinney | 204/322 |
| 4,011,165 | 3/1977 | Filippov et al. | 250/540 |
| 4,025,441 | 5/1977 | Tabata et al. | 250/540 |
| 4,265,730 | 5/1981 | Hirose et al. | 204/298 |
| 4,291,226 | 9/1981 | Rueggeberg | 250/324 |
| 4,446,110 | 5/1984 | Ahlbrandt | 422/186.05 |
| 4,654,199 | 3/1987 | Gloor et al. | 422/186.19 |
| 4,693,870 | 9/1987 | Gloor et al. | 422/186.19 |
| 4,774,062 | 9/1988 | Heinemann | 422/186.19 |
| 4,834,948 | 5/1989 | Schmiga et al. | 422/186.19 |
| 4,908,189 | 3/1990 | Staubach | 422/186.19 |
| 5,008,087 | 4/1991 | Batchelor | 422/186.22 |
| 5,293,043 | 3/1994 | Bonner | 250/324 |

FOREIGN PATENT DOCUMENTS

| | | |
|---|---|---|
| 2354209 | 10/1973 | Germany . |
| 2534033 | 7/1975 | Germany . |
| 765545 | 3/1955 | United Kingdom . |
| 1526070 | 12/1975 | United Kingdom . |
| 2022323A | 6/1978 | United Kingdom . |
| 0272430A | 3/1981 | United Kingdom . |

Primary Examiner—Donald P. Walsh
Assistant Examiner—Daniel Jenkins
Attorney, Agent, or Firm—Foley & Lardner

[57] ABSTRACT

A cooling system for the high voltage electrode of a corona treater includes an elongated hose disposed within the dielectric tube and around which the high voltage wire is spirally wound. The elongated hose is connected to a first port through which cooling fluid is introduced. The cooling fluid flows through the hose and out an open end into the dielectric tube. The cooling fluid then flows out of the dielectric tube through a second port and back to a reservoir after passing through a high voltage isolator.

12 Claims, 2 Drawing Sheets

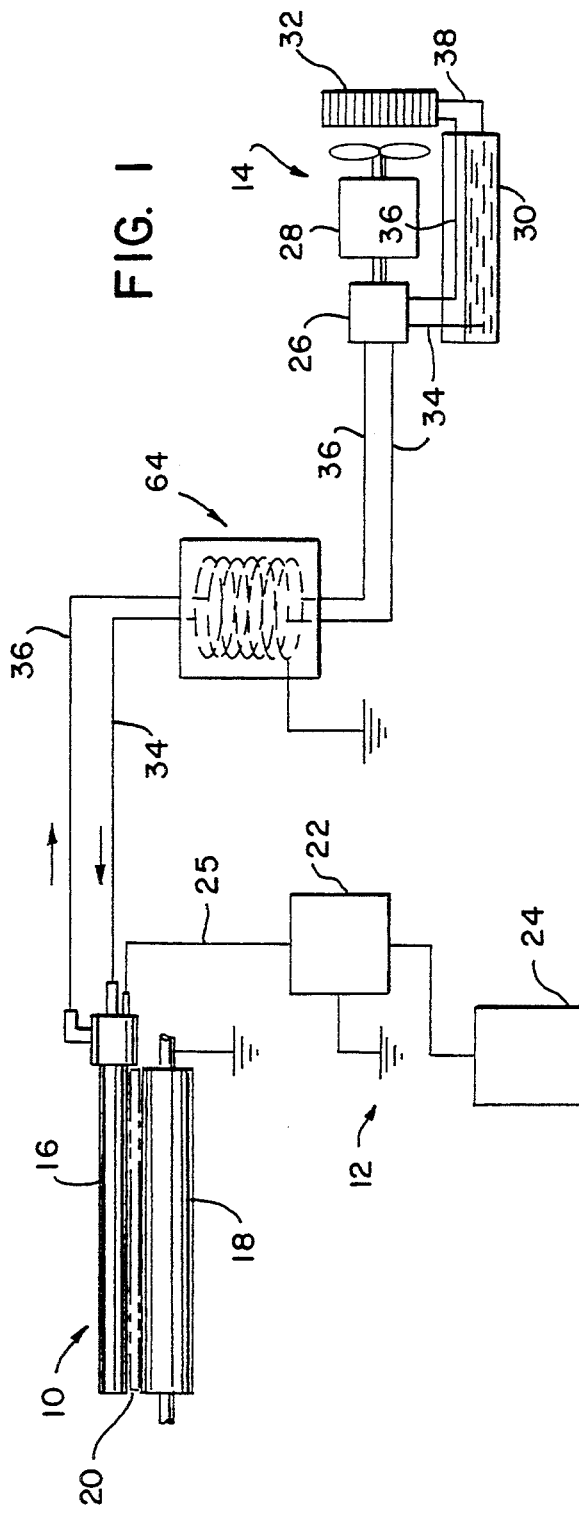
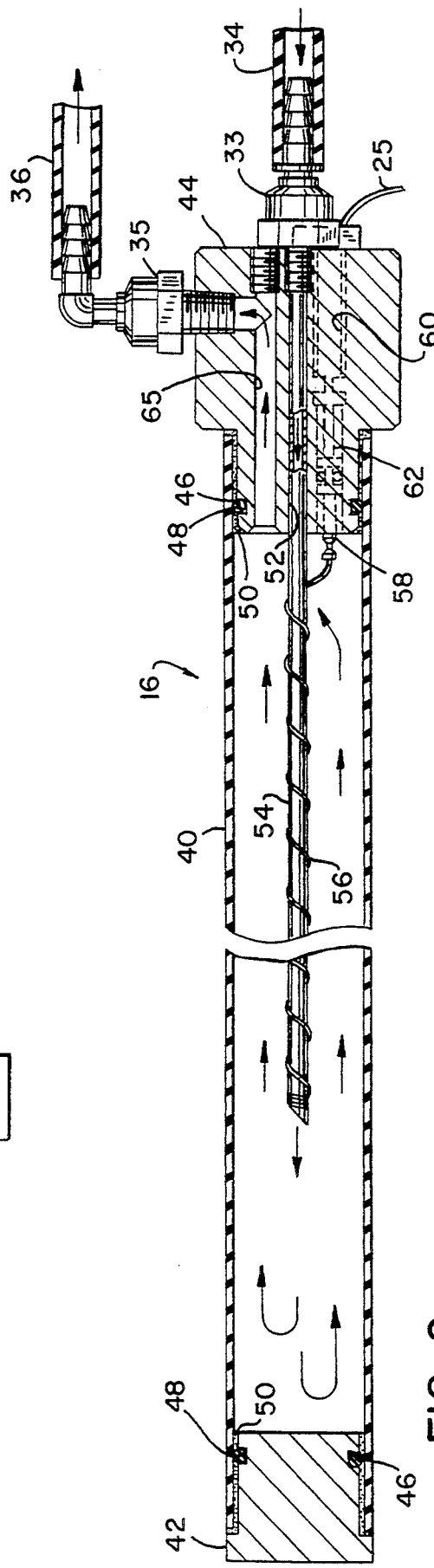
FIG. 1
FIG. 2

CORONA TREATER ELECTRODE COOLING SYSTEM

FIELD OF THE INVENTION

The present invention relates to corona treaters and more specifically to a cooling system for the high voltage electrode utilized in a corona treater.

BACKGROUND OF THE INVENTION

Corona treaters utilize high voltage electrodes to treat the surface of articles such as foils or films by electric discharge. The use of extremely high voltages on the discharge electrode results in very high discharge tube temperatures.

In the past, the discharge tube was cooled by passing large volumes of air across the tube at high speeds such as shown in U.S. Pat. No. 4,446,110. Such cooling systems did not lend themselves to use with corona treaters that utilize an inert or controlled atmosphere. Also, such cooling systems had inherent problems in that they introduced airborne particles and dust into the system and typically generated excessive noise.

While British Patent No. 2,022,323 A has suggested that discharge electrodes can be cooled by the use of a liquid cooling fluid, the actual structure and method of performing this method of cooling is left to the imagination.

SUMMARY OF THE PRESENT INVENTION

The primary object of the invention is to provide a liquid cooling system for the high voltage electrode of a corona treater. Such a system eliminates the dirt and noise problems typically associated with air cooling. Also, special atmospheres such as nitrogen can be contained within the corona treater without losses caused by exhaust air cooling.

In accordance with one aspect of the invention, the dielectric tube of a corona treater is provided with a first, port for introducing the cooling fluid into the dielectric tube and a second port for withdrawing the cooling fluid from the dielectric tube.

In accordance with still another aspect of the invention, a plastic tube is disposed within the dielectric tube and has one end connected to an inlet port at one end of the dielectric tube and the other end spaced from the inner end of the other end of the dielectric tube so that cooling fluid will flow through the plastic tube and reverse flow through the dielectric tube for discharge through an outlet port at the one end of the dielectric tube.

In accordance with yet another aspect of the invention, the high voltage wire is spirally wound around the plastic tube.

In accordance with still another aspect of the invention, the cooling system is provided with a reservoir and pump that circulates the cooling fluid through the dielectric tube.

In accordance with still another aspect of the invention, the cooling system is provided with a high voltage isolator disposed between the dielectric tube and the reservoir so that the high voltage present in the cooling system is safely conducted to earth ground.

The present invention thus provides an efficient, clean and quiet cooling system for the high voltage electrode of a corona treater that also allows the use of special or inert treating atmospheres.

Other principal features and advantages of the invention will become apparent to those skilled in the art upon review of the following drawings, the detailed description and the appended claims.

BRIEF DESCRIPTION OF THE DRAWINGS

FIG. 1 is a schematic diagram of a corona treater utilizing the cooling system of the present invention;

FIG. 2 is a side cross-sectional view of an electrode tube utilizing the cooling system of FIG. 1;

Figure 3:
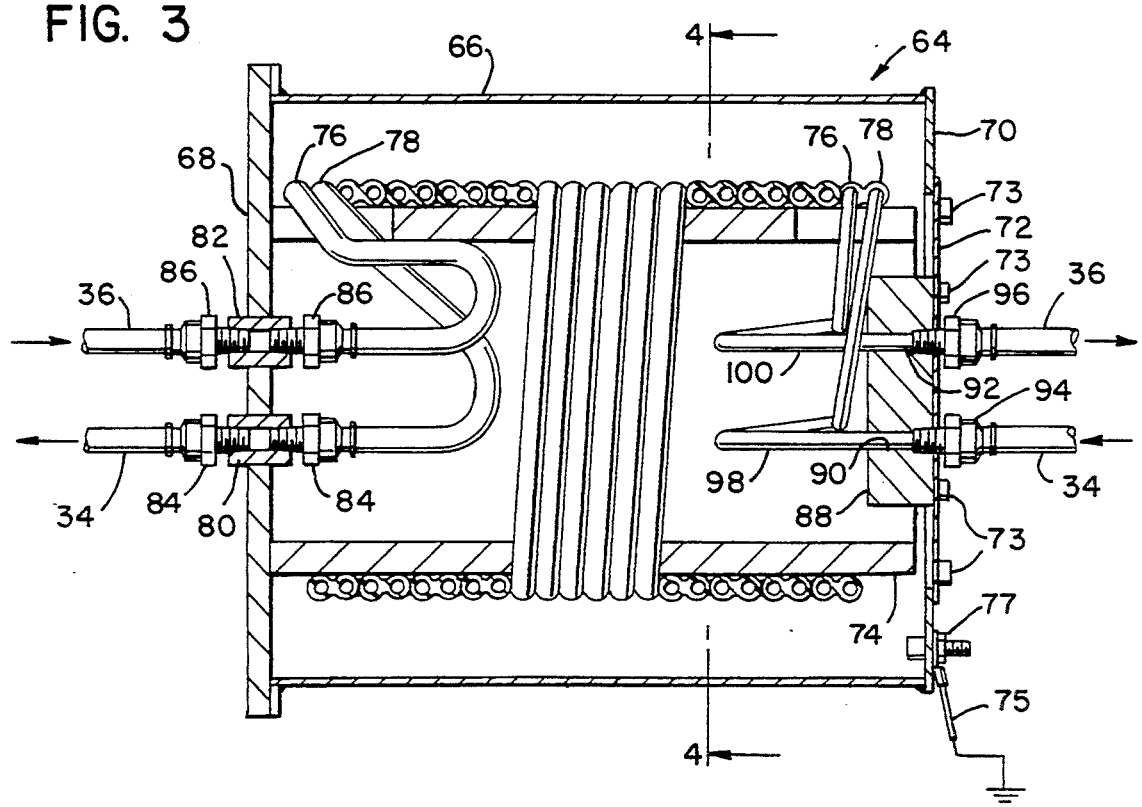
FIG. 3 is a side cross-sectional view of the high voltage isolator used in the cooling system of FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

FIG. 1 schematically illustrates a bare roll corona treater 10 and its associated power system 12 and cooling system 14. Corona treater 10 generally includes a discharge electrode 16 and a grounded bare roll 18 between which passes a web of paper or plastic film 20 that is treated by the corona discharge. The power system 12 includes a high voltage transformer 22 and a power supply 24 which are connected to discharge electrode 16 by a high voltage wire 25. The discharge electrode 16 is charged to approximately 10 to 15 kilovolts.

The cooling system 14 includes a pump 26 driven by a motor 28, a fluid reservoir 30 and a radiator 32. A cooling fluid such as water is pumped from the reservoir 30 through line 34 to the electrode 16 and returned through line 36 to the reservoir 30 through radiator 32 and line 38. The flow rate should be of approximately one-half gallon per minute with a pressure difference of 20 psi. between the inlet and outlet. Although water is disclosed herein other fluids such as distilled water or ethylene glycol may be used. A fan 39 is driven by motor 28 to direct air through the radiator to cool the returning water.

The discharge electrode 16 consists of a dielectric tube 40, preferably ceramic, that contains a conductive medium such as water within the tube 40 in order to distribute a high voltage charge uniformly along the length of the electrode 16. A cross sectional view of the electrode 16 is shown in FIG. 2 and generally includes a dielectric tube 40 having an end plug 42 at one end and a flow plug 44 at the other end. Each plug is formed from a plastic material such as Delrin. The plugs 42 and 44 are sealed in the ends of the tube 40 by an O-ring 46 which is seated in a groove 48 in each plug. It is important that the plugs be securely attached to the tube. In this regard an epoxy resin 50 is applied to the surface of each plug to hold the plugs in the ends of the tube. Grooves may be provided in the surface of the plug to assure that the epoxy adheres to the plug.

The flow plug 44 includes an axially extending passage 52 for supporting a nylon plastic tube 54. A bare wire 56 is spirally wrapped around tube 54 with one end of the wire 56 connected to an electric plug 58. The electric plug 58 is inserted into an opening 60 in flow plug 44 for engagement with a banana jack 62 mounted on the end of high voltage wire 25. A fluid return port 65 is provided at the top of the plug 44 to scavenge air bubbles that might be present within dielectric tube 40. Plastic fittings 33 and 35 are mounted in the flow plug 40 to connect inflow line 34 to tube 54 and outflow line 36 to fluid return port 65. The open end of the plastic tube should be spaced 2 to 4 inches from the end of the dielectric tube to allow sufficient space for fluid flow turn around.

Figure 4:
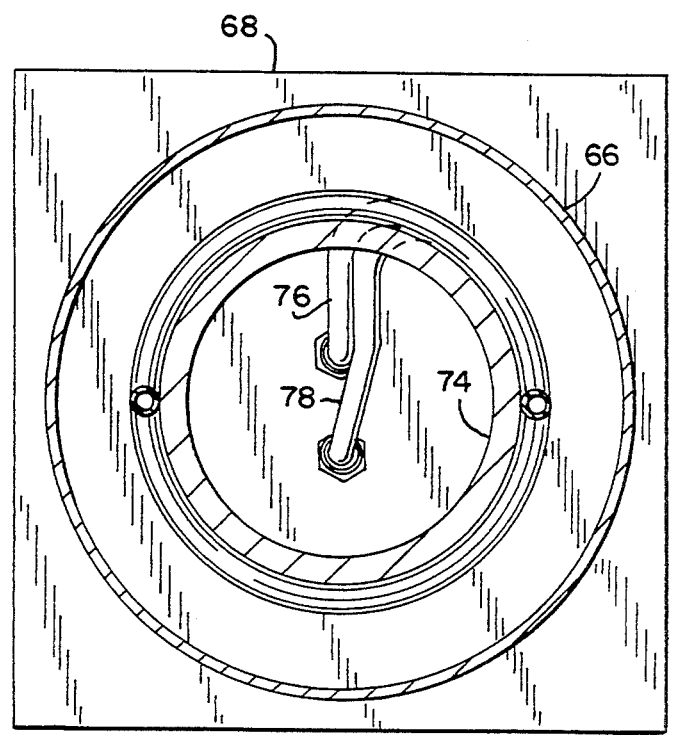
FIG. 4 is a sectional view along the line 4—4 of FIG. 3.

The heat generated by the corona discharge between electrode 16 and ground roll 18 is transmitted through the wall of tube 40 and is carried away by the cooling fluid within the electrode 16. The cooling fluid is, to some extent, electrically conductive. A high voltage isolator 64, FIGS. 3 and 4, is provided to safely dissipate the high voltage potential from being conducted back to the cooling system 14 and posing a shock hazard.

The isolator 64 generally includes a cylindrical housing or shroud 66 formed of electrically conductive material such as stainless steel. The housing 66 is closed at one end by an electrically nonconductive end plate 68 and at the other end by an electrically conductive disc 70. A removable electrically conductive cover plate 72 is mounted on disc 70 by screws 73. The metallic housing 66, disc 70 and plate 72 are grounded by a cable 75 connected to the disc 70 by screw 77. A nonconductive tubular plastic cylinder 74 is mounted on panel 68. Two lengths of plastic tubing 76 and 78, each approximately 20 feet long, are spirally wrapped around the cylinder 74. Plastic insulators 80 and 82 are mounted in the panel 68. Plastic fittings 84 are threaded into insulator 80 for connecting tube 76 to inflow line 34. Plastic fittings 86 are threaded into insulator 82 for connecting tube 78 to outflow line 36.

A metal block 88 having openings 90 and 92 is mounted on the inside of plate 72 for connecting tubes 76 and 78 to lines 36 and 34, respectively. In this regard, plastic fittings 94 and 96 are threaded into openings 90 and 92, respectively, for connecting lines 34 and 36 to block 88. Stainless steel tubes 98 and 100 connect tubes 78 and 76 to the fittings 94 and 96. It should be noted that the steel tubing 98 and 100 and metal block 88 provide a ground path to ground cable 75.

In operation, cooling fluid is pumped from the reservoir 30 by pump 26. Cooling fluid passes through line 34 and tube 78 into the electrode 16. The cooling fluid enters electrode 16 through passage 52 and tube 54 and is discharged from tube 54 at the far end of tube 40. The cooling fluid enters dielectric tube 40 and reverses flow direction and flows back to return port 65. The fluid is heated as it flows through the tube to port 65. The fluid due to its slight electrical conductivity, conducts the high voltage present along wire 56 to the walls of the dielectric tube 40. It should be noted that the passage through end plug 64 to port 30 is situated at the top of the plug to scavenge air bubbles that might be present within dielectric tube 40.

The heated fluid leaves the electrode 16 through return port 65 travels back through tube 76 and line 36 to the radiator 32. The fluid passing through tube 78 to the electrode and the fluid flowing through tube 76 to the reservoir is at high voltage potential due to electrical energy being conducted through the fluid from the electrode 16. As the fluid travels through tubes 76 and 78 in the isolator 64 the electrical energy of the fluid is grounded through the block 88, cover 72 and disc 70 to the ground cable 75. The fluid flows through fitting 96 at ground potential and travels through line 36 to radiator 32 where the fluid is cooled and recirculated to reservoir 30.

The present invention provides a means of cooling the electrode without using high velocity exhaust air. The isolator permits cooling of the electrode with fluid without the danger of high voltage being conducted back to the pumping mechanism. As such, clean and quiet corona treater machinery that can operate with controlled or inert atmospheres is possible.

Thus, it should be apparent that there has been provided in accordance with the present invention a corona treater electrode cooling system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A cooling system for the high voltage electrode of a corona treater of the type utilizing an elongated high voltage wire disposed within a dielectric tube, said cooling system comprising:
   a first port disposed in one end of said dielectric tube for introducing a cooling fluid into the dielectric tube,
   a second port disposed in said one end of said dielectric tube for withdrawing said cooling fluid from the dielectric tube,
   a nonconductive tube disposed within said dielectric tube and having one end connected to one of said ports and having the other end open in the other end of said dielectric tube so that cooling fluid flows through said tube to the other end of said dielectric tube, and said high voltage wire being supported by said nonconductive tube,
   a high voltage isolator means disposed between said dielectric tube and said reservoir for removing residual electric charge from said cooling fluid passing through said isolator means.

2. The cooling system defined in claim 1 wherein said high voltage wire is spirally wound around said nonconductive tube.

3. The cooling system defined in claim 1 wherein said nonconductive tube is connected to said first port.

4. The cooling system defined in claim 1 further comprising a reservoir of cooling fluid connected to said first and second ports and pump means operatively connected to said reservoir for circulating said cooling through the dielectric tube.

5. The cooling system defined in claim 4 wherein said high voltage isolator comprises a grounded container containing a length of tubing having one end operatively connected to said second port and the other end operatively connected to said reservoir so that heated and charged cooling fluid flows through said length of tubing and dissipates any accumulated electrical charge.

6. The cooling system defined in claim 5 wherein said high voltage isolator further comprises a second length of tubing having one end operatively connected to said first port and the other end operatively connected to said reservoir so that cooling fluid flowing to said first port flows through said isolator.

7. A cooling system for the high voltage electrode of a corona treater of the type utilizing an elongated high voltage wire disposed within a dielectric tube, said cooling system comprising:

a first port and a second port for circulating a cooling fluid through the dielectric tube, a plastic tube disposed within said dielectric tube and having one end connected to one of said first and second ports and the other end open so that cooling fluid flows through said plastic tube, a reservoir of cooling fluid connected to said first and second ports, a pump operatively connected to said reservoir for circulating the cooling fluid through the dielectric tube, and a high voltage isolator means disposed between said dielectric tube and said reservoir for isolating said reservoir from the residual electric charge of said cooling fluid.

8. The system according to claim 7 wherein said plastic tube and said pump are connected to said first port whereby said cooling fluid passes through plastic tube into said dielectric tube.

9. The system according to claim 8 wherein said first and second ports are located in the same end of the dielectric tube whereby said cooling fluid passes through the plastic tube into the other end of said dielectric tube and returns through said dielectric tube for discharge through said second port.

10. A system for cooling the high voltage electrode of a corona treater, said cooling system comprising:

a nonconductive tube axially aligned in said dielectric tube and having one end mounted in one end of the dielectric tube and the other end terminating in spaced relation to the other end of the dielectric tube, a high voltage wire supported by said nonconductive tube, one end of said wire being connected to a high voltage source, and the other end terminating at the end of the nonconductive tube, means for admitting water into the end of said nonconductive tube mounted in said one end of said dielectric tube, an outlet in said one end of said dielectric tube for discharging water from said dielectric tube, and a pump assembly for circulating water through said nonconductive tube into said dielectric tube for discharge through said outlet in said dielectric tube, a high voltage isolator means disposed between said dielectric tube and said reservoir for removing residual electric charge from said cooling fluid passing through said isolator means.

11. The system according to claim 10 wherein said pump assembly includes a pump and a reservoir for circulating water through said dielectric tube.

12. The system according to claim 11 wherein said isolator means includes a cylindrical housing having a nonconductive plate on one end and a conductive plate at the other end, a nonconductive cylinder mounted on the inside of said nonconductive plate, an inlet port and an outlet port in said nonconductive plate and in said conductive plate, a first tube spirally wrapped around said nonconductive cylinder and having one end connected to the inlet port in said conductive plate and the other end to the outlet port in the nonconductive plate, a second tube spirally wrapped around said nonconductive cylinder and having one end connected to the inlet port in said conductive plate and the other end connected to the outlet port in said nonconductive plate, said conductive plate being grounded to remove any residual charge in said water passing through said isolator.

* * * * *